Oct. 4, 1955          G. L. SANFORD          2,719,469
CAMERA FLASH GUN ATTACHMENT
Filed Oct. 17, 1952
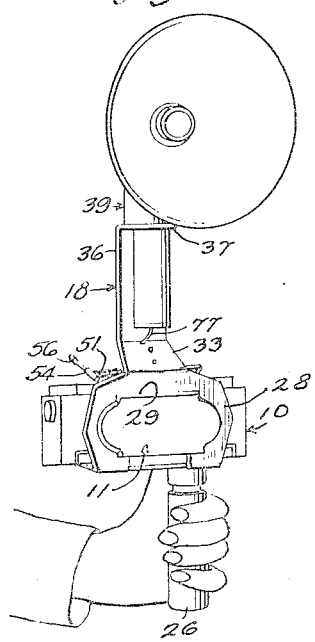
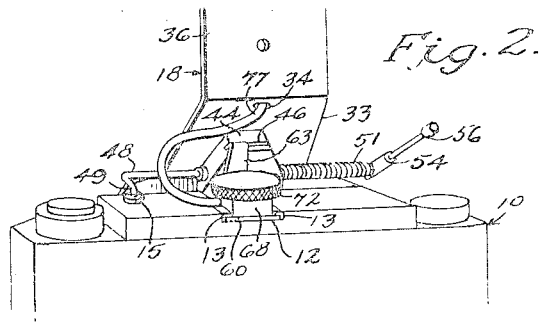
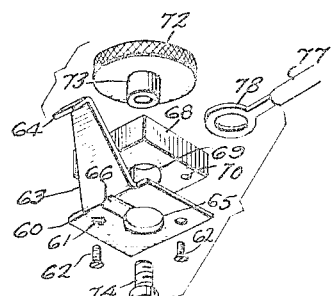
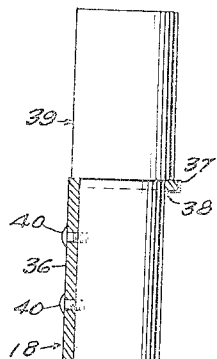
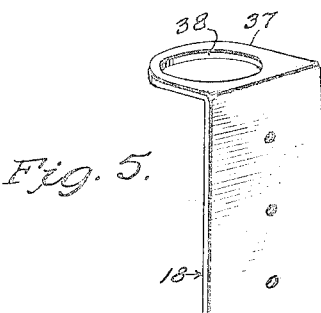
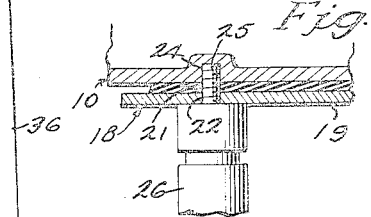
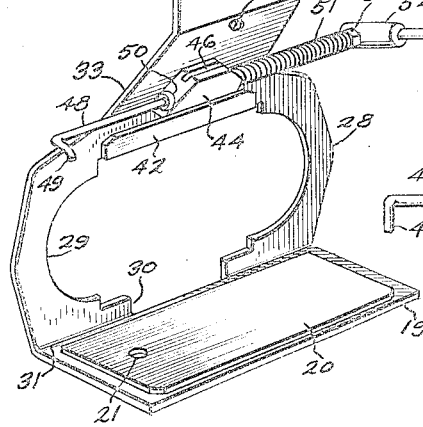
INVENTOR
GERALD L. SANFORD
BY John F. Phillips
ATTORNEY United States Patent Office 2,719,469
Patented Oct. 4, 1955

2,719,469

CAMERA FLASH GUN ATTACHMENT

Gerald L. Sanford, Brookline, Mass.

Application October 17, 1952, Serial No. 315,310

11 Claims. (Cl. 95—11.5)

This invention relates to a camera flash gun attachment and the combination of such an attachment with a camera.

It is the common practice in the manufacture of cameras to provide a socket or similar means for supporting a flash attachment for the camera, which socket cooperates with the shutter release means of the camera to close a battery circuit through a flash bulb to provide the necessary flashlight in proper coordination with the shutter release.

These flash attachments leave much to be desired. For example, the sockets do not provide sufficiently rugged and dependable means for supporting the flash attachment, and, accordingly, the latter, particularly in careless handling of the camera, can become detached. Moreover, such flash attachments serve the purpose of coordinating the operation of the flashlight with the operation of the shutter release and perform no other function, in the sense that they do not facilitate in any way the carrying out of the normal functions incident to the taking of flashlight pictures. There are several other objections to devices of this character which need not be particularly specified.

An important object of the present invention is to provide a flashlight attachment wherein a novel type of bracket is ruggedly fixed relative to the camera against any possible displacement therefrom, and which facilitates the carrying out of several of the functions normal to the taking of flashlight pictures.

A further object is to provide such an attachment employing a novel type of bracket which is primarily fixed relative to the camera at the bottom thereof, and which supports the usual flash elements substantially above the camera, the portions of the bracket connecting the bottom attaching portion and the flashlight portion extending forwardly of the camera and clear of the lens mounting thereof, thus providing a highly effective type of bracket and attaching means therefor without interfering with the winding of the film or any other functions which need be performed at the back of the camera.

A further object is to provide such a device wherein the bracket may be rigidly connected to the camera by a supporting handle beneath the camera, which handle may be grasped in the left hand for supporting the camera and the present attachment, and to provide novel highly accessible means for operating the shutter release by the right hand.

A further object is to provide such a device wherein the portion of the bracket arranged forwardly of the camera is cut away to correspond in shape to, and substantially fit, the lens mounting to assist in maintaining the bracket in position without interfering with the normal functioning of the lens or lenses.

A further object is to provide such a device wherein the bracket is provided with a bearing for supporting a rock shaft having a finger piece movable by the right hand of the operator to operate the shutter release.

A further object is to provide a novel combination of the present device with a camera wherein the usual flash supporting socket of the camera is utilized for completing an electrical circuit through the flash elements but does not support the bracket or any elements carried thereby.

A further object is to provide a combination of this character wherein the attachment is utilized for preventing displacement from the socket referred to of the means connected thereto for completing the electrical circuit.

A further object is to provide a device of this character employing a simple and rugged type of unitary bracket which may be made of such material as anodized aluminum, thus combining light weight with substantial strength.

Other objects and advantages of the invention will become apparent during the course of the following description.

In the drawing I have shown one embodiment of the invention. In this showing:

Figure 1 is a perspective view of the device in operative position on a camera, illustrating the supporting handle and the reflector, the flash bulb being omitted;

Figure 2 is a somewhat enlarged fragmentary perspective view looking from the back of the camera, showing the upper portion of the camera and the associated parts of the present device;

Figure 3 is a central vertical sectional view through the device and associated elements, parts being shown in elevation and the camera being shown in dotted lines;

Figure 4 is a detail perspective view of the electrical connecting parts adapted for connection with the usual flash attachment socket of a camera, the elements being shown separated;

Figure 5 is an enlarged perspective view, looking from the rear thereof, showing the unitary bracket forming the body of the present device, together with the elements carried thereby;

Figure 6 is a fragmentary sectional view showing the connection of the handle to the bottom of the camera for fixing the bracket of the present device to the camera; and Figure 7 is a detail sectional view on line 7—7 of Figure 3.

Referring to Figures 1 and 2, the numeral 10 designates as a whole a standard type of camera shown in the present instance as a particular make of stereoscopic camera at the front of which is arranged a lens mounting indicated as a whole by the numeral 11. The portion of the lens mounting shown in Figure 1 is the hinged cover adapted to be swung upwardly to a substantially horizontal position to clear the usual stereoscopic lenses (not shown). The camera further includes the usual means, not shown, for winding a film in the camera, exhibiting through a window in the back of the camera the number of the film in position to be exposed, etc., as will be clearly understood.

The present camera is of the type provided in the top thereof with a rearwardly opening socket 12 defined at its edges by forwardly and rearwardly extending overhanging guides 13 which usually receive and support relative to the camera any one of a number of conventional flash gun attachments. The socket 12 is conventional in all its parts and need not be described in detail, and accordingly there is shown in Figure 3 only the conventional depressible ball 14 arranged in the socket 12 to form an electrical contact. This contact is connected in circuit with a conventional switch (not shown), operated upon depression of the conventional shutter release 15 (Figure 2) for completing a circuit through a flash bulb.

The device forming the subject matter of the present invention comprises a bracket indicated as a whole by the numeral 18 and shown in its entirety in perspective in Figure 5. This bracket is preferably formed of a unitary sheet of aluminum, anodized to lend the bracket substantial structural strength to enable it to withstand hard usage and to support relatively heavy flash devices, such as a conventional three-way reflector head (not shown). The bracket 18 comprises a flat bottom section 19 to the top of which is cemented or otherwise attached a rubber or similar protecting sheet 20. This sheet is provided toward the left-hand end thereof, as shown in Figure 5, with an opening 21 registering with an opening 22 in the bottom member 19 of the bracket for a purpose to be described.

The bottom of the camera 10 is provided with an internally threaded socket 24, as generally shown in Figure 6, to receive a threaded stem 25 carried by a handle 26 the upper end of which seats tightly against the bottom of the bracket portion 19 when the parts are assembled. The handle thus serves not only for supporting the camera and the present attachment, but also for clamping the bracket in position relative to the camera.

The bracket further comprises a forward wall 28 extending vertically across the front of the camera and provided with an opening 29 the greater portion of which corresponds closely in shape to the lens mounting 11, not only for the purpose of clearing the lenses and permitting the opening of the cover 11 but also for the purpose of engaging the lens mounting to stabilize the bracket relative to the camera. The opening 29 is extended at the bottom, as at 30, to facilitate engaging the bottom of the cover with the finger to swing it to open position, and also to allow the shutter cocking lever to be moved to the cocked position.

Above the front of the camera, the bracket is bent upwardly and rearwardly at an angle along a line 32 to provide an inclined bracket portion 33 having an opening 34 therethrough for a purpose to be described. At the upper extremity of the portion 33, the bracket is again bent along a line 35 to form an upwardly extending portion 36 the upper end of which terminates in a forwardly extending arm portion 37 having a relatively large opening 38 therethrough. A conventional socket and battery case unit 39 projects through the opening 38 and the lower or battery case portion of such unit is fixed by screws, or the like, 40 to the bracket portion 36. It will be apparent that the bracket portion 33 is substantially narrower than the front plate portion 28 and tapers slightly to decrease in width upwardly to the point where it merges with the upstanding bracket portion 36.

Above the opening 29, the plate portion 28 of the bracket is provided with a relatively narrow horizontal cushion strip 42 the upper edge of which terminates below the bend 33. Within this bend, and shaped to fit against the adjacent inner faces of the bracket portions 28 and 33, is a bearing 44 fixed to the bracket portion 33 by screws 45. The upper edge of the bearing 44 is provided with a slot 46 for a purpose to be described.

The bearing 44 receives and supports a rock shaft 48 one end of which is turned rearwardly and downwardly, as at 49, to form a mechanical contact element engageable with the shutter release to depress the latter upon the rocking of the shaft 48. The rock shaft carries a collar 50 fixed thereto and engaging one end of the bearing 44. The right-hand end of the shaft 48 is surrounded by a spring 51, which is a compression spring, to hold the collar 50 in engagement with the bearing 44. The spring 51 contacts at one end with the bearing 44 and at its opposite end with a nut 52 having a rounded outer end arranged in a recess 53 formed in a handle stem 54. The adjacent end of the shaft 48 is threaded as at 55 in the stem 54. The nut 52 accordingly acts as a spring seat and as a jam nut for the stem 54. This stem projects laterally from the shaft 48 to provide a finger piece 56 depressible to rock the shaft 48 and operate the shutter release.

As previously stated, the socket 12 is a conventional part of the camera and normally supports a complete flash attachment. In accordance with the present invention, the body of the flash attachment comprises the bracket 18 which is attached to the camera in the manner described. However, the socket 12 and its contact ball 14 (Figure 3) are utilized in the completion of the circuit from the conventional camera switch through the electrical elements of the device. Referring particularly to Figure 4, the numeral 60 designates a plate the body of which is generally square in shape and is provided adjacent opposite corners with apertures 61 to receive screws 62 for a purpose to be described. Integral with the plate 60 is an upwardly and forwardly arranged clip 63 provided at its free end with a downwardly and forwardly extending lip 64 engageable in the slot 46, as will be understood below. The plate 60 is provided with a central aperture 65 of substantial size, and the plate 60 is grooved as at 66 to facilitate the sliding of the plate 60 over the contact ball 14 in assembling the device relative to a camera.

Above the plate 60 is an insulating block 68 corresponding generally in shape to, but narrower than, the plate 60 and provided with a central aperture 69 smaller than the aperture 65. The block 68 is provided with internally threaded openings 70 aligning with the openings 61 to receive the screws 62 and thus secure the plate 60 to the block 68. Above the block 68 is a knurled button 72 having a depending axial, internally threaded extension 73 to receive a screw 74 having a head 75 the bottom of which is slightly concaved as at 76.

An electric wire 77 is provided with a terminal 78 adapted for electrical engagement with the screw 74 and thence through the head 75 thereof to the contact ball 14, this wire extending through the bracket opening 34 into the battery case, as shown in Figures 2 and 3. The terminal 78 may be electrically connected to the screws 74 in any suitable manner. For example, the opening in the terminal 78 may surround the projection 73 in contact with the button 72, or the head 75 of the screw 74 may be deep enough to contact the terminal 78 above the block 68, etc. The particular means for establishing such electrical contact is unimportant, but especial attention is invited to the fact that the opening 65 is substantially larger than the screw head 77 to prevent an electrical contact between the plate 60 and head 75, the opening 69 being approximately the size of the head 75 to anchor the latter against any lateral movement which might electrically engage it with the plate 60. The plate 60 is fixed to the block 68 by the screws 62, with the openings 65 and 69 in axial alignment and with the screw 74 received in the projection 73. The concave bottom 76 of the screw head 75 engages the button 14, as previously stated.

*Operation*

The socket and battery unit 39 and the reflector shown in Figure 1 are conventional and form, per se, no part of the present invention. These elements are assembled with respect to each other in the usual manner, and the proper flash bulb is inserted in the socket of the reflector. The device is attached to the camera for placing the bracket around the camera, as shown in Figure 3, and then inserting the screw 25 in the socket 24 and tightening the upper end of the handle 26 against the bracket bottom 19. The opening 29 is designed to receive the lens mounting of the particular camera in connection with which the device is intended to be used, this being preferred so that the lens mounting is utilized for assisting in holding the bracket 18 in position. Thus the bracket is securely fixed with respect to the camera.

The assembly of elements shown in Figure 4 is placed in position as shown in Figures 2 and 3, and the screw head 75 engages the contact ball 34, whereby the circuit through the flash bulb is broken only at the conventional camera switch (not shown) within the camera.

The finger 64 is engaged in the slot 46 for two purposes. In this connection, it may be pointed out that with conventional flash attachments received in the socket 12 or a similar socket, a slight jarring of the camera frequently results in breaking electrical contact with the ball 14 and the circuit will not be closed through the flash bulb when the shutter release is operated. With the present device, the socket 12 is relieved of the necessity for carrying relatively heavy parts which, in common practice, possess a relatively high degree of inertia which allows them to be jarred loose from the sockets. The socket 12 in the present case carries only the relatively light parts associated with the electrical means, and the clip 63 and its finger 64, when the latter engages the slot 46, prevent rearward movement of the assembly shown, in Figure 4, thus preventing disengagement of the screw head 75 from the contact ball 14. Thus, the operator is always assured of the proper completion of the flash bulb circuit whenever the shutter release is operated. In the second place, movement of the plate 60 and block 68 toward the front of the camera is limited by the horizontal dimension of the socket 12 transversely of the camera in accordance with conventional practice. The clip 63 therefore acts as a tension member engaging the bearing 44, which in turn is fixed to the bracket portion 33, thus tending to prevent any bending of the bracket above the camera.

In operating the device the photographer will insert the proper flash bulb in the reflector, sight the picture to be taken through the finders, and when ready, will depress the finger piece 56 to rock the shaft 48. This operates the shutter release 15 and closes the circuit through the flash bulb to properly illuminate the subject in proper timed relation to the shutter opening. Particular attention is invited to the fact that the handle 26 not only fixes the bracket 18 and associated elements relative to the camera, but also serves as a supporting handle for the entire structure, which can be readily held by the left hand of the operator, as shown in Figure 1. Thus, the right hand of the operator is wholly free to operate the finger piece 56 and to perform other necessary functions in the completing of the exposure of the picture, preparing for the next picture, etc. For example, the operator's right hand is free to cock the shutter, turn the focusing knob, operate the finger piece 56, and finally operate the film winding knob. These operations are wholly performed by the right hand without the aid of the left hand and with a minimum of motion and jiggling of the camera while the left hand supports the entire assembly of elements. Moreover, the back of the camera may be opened to remove and replace the film without detaching the present device from the camera.

The collar 50 is fixed to the shaft 48 at the proper distance from the left-hand end thereof, so that movement of the shaft 48 to the right in Figures 2 and 5 by the spring 51 properly positions the finger 49 over the shutter release 15. The shaft 48 is inserted through the bearing 44 from the left in Figures 2 and 5, whereupon the spring 51 is placed in position, the nut 52 screwed up on the adjacent end of the shaft, and the stem 54 threaded on the shaft. Holding the nut 52 with a pair of pliers, the stem 54 may be turned to tighten it relative to the nut 52 to fix these two elements rigidly with respect to each other and with respect to the shaft 48.

The present device permits the mounting of the reflector a substantial distance above the camera, thus doing away with the so-called "red eyes" from the subject being photographed. The high position of the flash bulb above the center of the camera lens prevents the light from striking the subject's eyes at such an angle as to provide light reflection from the eyes, which causes the resultant "red eyes" on the developed picture.

The device will not be affected or electrical contact lost if the button 72 becomes slightly loosened, and it is necessary in practice for this button to be turned over two complete revolutions before the operation of the device will be affected. Even if the button is somewhat loosened, the clip 63 maintains the proper relation of the parts for the completion of a circuit through the flash bulb whenever the shutter release is operated in the manner stated.

I claim:

1. A flash bulb attachment for cameras comprising a bracket, means for securing said bracket to a camera, said bracket being provided with a portion extending above the camera and provided with means for supporting a flash bulb and associated elements, a bearing carried by said bracket above the camera, a horizontal rock shaft mounted in said bearing parallel to the top of the camera and provided at one end with a finger arranged above and movable downwardly to depress the shutter release of the camera, and an operating handle carried by said shaft.

2. A device constructed in accordance with claim 1, wherein said handle is carried by the other end of said shaft, the means for securing said bracket to the camera comprising a supporting handle beneath the camera having a screw at its upper end and said bracket having an opening through which said screw extends to be threaded in the tripod screw-receiving opening in the bottom of the camera, said supporting handle being arranged adjacent the end of said camera opposite said handle, whereby the camera may be supported by said supporting handle with one hand of the operator while the other hand of the operator is free to operate said operating handle.

3. A flash bulb attachment for a camera, comprising a bracket formed of a unitary sheet of material having a bottom portion engageable against the bottom of the camera, a forward portion extending upwardly forwardly of the camera and apertured for the camera lens, a rearwardly and upwardly extending angular portion above said forward portion, an upwardly extending portion above the camera and a top portion for supporting a flash bulb and associated elements, a bearing carried by said angular portion of said bracket, a horizontal rock shaft mounted in said bearing parallel to the top of the camera and extending longitudinally of the camera thereabove, said rock shaft having a finger at one end overlying the camera shutter release and movable downwardly to operate such release when said shaft is rocked in one direction, and an operating handle carried by said shaft.

4. A device constructed in accordance with claim 3, wherein said shaft comprises a straight rod having the end opposite said finger slidable through said bearing, means carried by said shaft for limiting sliding movement thereof relative to said bearing to position said finger above the shutter release, said handle being carried by the other end of said shaft, and a compression spring arranged between said handle and said bearing to maintain said collar in engagement with said bearing.

5. A flash bulb attachment for a camera, comprising a bracket formed of a unitary sheet of material having a bottom portion engageable against the bottom of the camera, a forward portion extending upwardly forwardly of the camera and apertured for the camera lens, a rearwardly and upwardly extending angular portion above said forward portion, an upwardly extending portion above the camera and a top portion for supporting a flash bulb and associated elements, a bearing carried by said angular portion of said bracket, a rock shaft mounted in said bearing and extending longitudinally of the camera thereabove, said rock shaft having a finger at one end overlying the camera shutter release and movable downwardly to operate such release when said shaft is rocked in one direction, said bearing having a slot therein, a circuit completing device attachable to the camera, and a clip carried by said device and having an end engageable in said slot to maintain said circuit completing device in position relative to the camera.

6. A device constructed in accordance with claim 5, wherein said shaft is slidable in said bearing, a collar carried by said shaft and engageable with said bearing to limit sliding movement of said shaft in one direction to a position wherein said finger is arranged above the shutter release, a handle carried by the other end of said shaft, and a coil spring arranged between said bearing and said handle and urging said shaft in said direction.

7. In combination with a camera having a lens mounting forwardly of the camera and a shutter release at the top of the camera, a bracket having a bottom portion fixed to the camera therebeneath, a forward portion extending upwardly over the front of the camera and apertured to receive the lens mounting, an upper portion extending above the camera and having means for securing thereto a flash bulb mounting, a bearing carried by said bracket above the camera, a horizontal rock shaft mounted in said bearing parallel to the top of the camera and having an offset finger arranged above said shutter release and engageable therewith to operate it upon the rocking of said shaft, and an operating handle carried by said shaft.

8. In combination with a camera having a lens mounting forwardly of the camera and a shutter release at the top of the camera, a bracket having a bottom portion fixed to the camera therebeneath, a forward portion extending upwardly over the front of the camera and apertured to receive the lens mounting, an upper portion extending above the camera and having means for securing thereto a flash bulb mounting, a bearing carried by said bracket above the camera, a horizontal rock shaft mounted in said bearing parallel to the top of the camera and having an offset finger arranged above said shutter release and engageable therewith to operate it upon the rocking of said shaft, said finger being arranged at one end of said shaft, a handle carried by the other end of said shaft, said shaft being slidable in said bearing, a collar carried by said shaft and engaging said bearing at the end thereof opposite said handle, and a compression spring arranged between said handle and the other end of said bearing to maintain said collar in engagement therewith.

9. The combination set forth in claim 8, wherein said bottom portion of said bracket is provided with a supporting handle arranged beneath the camera and arranged toward one end of said camera corresponding to the end of said shaft which carries said finger, said operating handle being carried by the other end of said shaft, whereby the operator may hold said supporting handle with his left hand and operate said operating handle with his right hand, with the camera supported directly in front of him.

10. In combination with a camera having a forward lens mounting, a top shutter release and top rearwardly opening socket having a contact element therein, a bracket having a bottom portion fixed against the bottom of the camera, a forward portion extending upwardly over the front of the camera and apertured to fit and receive the lens mounting, said bracket projecting above the camera and having means spaced above the camera for supporting a flash bulb unit, a bearing carried by said bracket just above the camera and adjacent the front thereof, a horizontal shaft mounted in said bearing and extending longitudinally of the camera, said shaft having a finger at one end arranged above and engageable with the shutter release to operate it upon rocking movement of said shaft in one direction, a handle connected to the other end of said shaft, a circuit completing device mounted in said socket wholly mechanically independently of said bracket and having an element engaging said contact element, and a wire connected to said circuit completing element and extending to said flash bulb unit.

11. In combination with a camera having a forward lens mounting, a top shutter release and top rearwardly opening socket having a contact element therein, a bracket having a bottom portion fixed against the bottom of the camera, a forward portion extending upwardly over the front of the camera and apertured to fit and receive the lens mounting, said bracket projecting above the camera and having means spaced above the camera for supporting a flash bulb unit, a bearing carried by said bracket just above the camera and adjacent the front thereof, a horizontal shaft mounted in said bearing and extending longitudinally of the camera, said shaft having a finger at one end arranged above and engageable with the shutter release to operate it upon rocking movement of said shaft in one direction, a handle connected to the other end of said shaft, a circuit completing device mounted in said socket wholly mechanically independently of said bracket and having an element engaging said contact element, a wire connected to said circuit completing element and extending to said flash bulb unit, said bearing having an upper surface provided with a slot extending longitudinally of the camera, and a clip carried by said circuit completing device and engaging in said slot to prevent rearward movement of said circuit completing device rearwardly in said slot.

References Cited in the file of this patent

UNITED STATES PATENTS

| | | |
|---|---|---|
| 2,317,465 | Kende et al. | Apr. 27, 1943 |
| 2,479,716 | Bensen | Aug. 23, 1949 |

FOREIGN PATENTS

| | | |
|---|---|---|
| 870,005 | France | Nov. 27, 1941 |
| 726,694 | Germany | Oct. 19, 1942 |